(12) United States Patent
Moon et al.

(10) Patent No.: US 8,643,251 B2
(45) Date of Patent: Feb. 4, 2014

(54) PIEZOELECTRIC MOTOR HAVING A PLURALITY OF PIEZOELECTRIC ELEMENTS

(75) Inventors: Chan-young Moon, Siheung-si (KR); Woo-jong Cho, Suwon-si (KR); Mun-cheol Choi, Hwaseong-si (KR); Cheol-eun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 12/956,213

(22) Filed: Nov. 30, 2010

(65) Prior Publication Data

US 2011/0133602 A1 Jun. 9, 2011

(30) Foreign Application Priority Data

Dec. 4, 2009 (KR) ................. 10-2009-0119902

(51) Int. Cl.
*H01L 41/08* (2006.01)
*H02N 2/16* (2006.01)

(52) U.S. Cl.
CPC ..................................... *H02N 2/16* (2013.01)
USPC .................................................... 310/323.06

(58) Field of Classification Search
USPC ............................................................ 310/323
See application file for complete search history.

(56) References Cited

U.S. PATENT DOCUMENTS

| | | | |
|---|---|---|---|
| 4,513,219 A | | 4/1985 | Katsuma et al. |
| 4,580,073 A | * | 4/1986 | Okumura et al. ........ 310/323.04 |
| 5,408,156 A | * | 4/1995 | Kawasaki et al. ........ 310/323.06 |
| 5,451,827 A | * | 9/1995 | Takagi ..................... 310/323.05 |
| 5,719,462 A | * | 2/1998 | Takagi ..................... 310/323.03 |
| 6,518,689 B2 | * | 2/2003 | Yerganian ................ 310/323.06 |
| 6,674,217 B1 | * | 1/2004 | Fujimoto ................. 310/323.06 |
| 6,952,073 B2 | * | 10/2005 | Yamamoto ............... 310/323.06 |
| 2009/0134744 A1 | * | 5/2009 | Yoon et al. ............... 310/323.06 |
| 2010/0283356 A1 | * | 11/2010 | Tamai ...................... 310/323.06 |

* cited by examiner

*Primary Examiner* — J. San Martin
(74) *Attorney, Agent, or Firm* — Drinker Biddle & Reath LLP

(57) ABSTRACT

Provided is a piezoelectric motor including: a stator which includes first and second faces, wherein a plurality of piezoelectric elements are arranged on the first face, and a plurality of protrusions are formed on the second face; a rotor which is rotated by motions of waves of the stator generated by the piezoelectric elements; and a driver device which applies driving voltages to the piezoelectric elements, wherein polarization directions of the plurality of piezoelectric elements are vertical to a rotary face of the rotor.

14 Claims, 5 Drawing Sheets

PIEZOELECTRIC MOTOR HAVING A PLURALITY OF PIEZOELECTRIC ELEMENTS

CROSS-REFERENCE TO RELATED PATENT APPLICATION

This application claims the benefit of Korean Patent Application No. 10-2009-0119902, filed on Dec. 4, 2009, in the Korean Intellectual Property Office, the disclosure of which is incorporated herein in its entirety by reference.

BACKGROUND

The invention relates to a piezoelectric motor, and more particularly, to a piezoelectric motor including a stator on which a plurality of piezoelectric elements are arranged.

In general, a piezoelectric motor includes piezoelectric elements, uses a high frequency voltage as a driving voltage, and has a driving force generated by a friction between a stator and a rotor.

The piezoelectric motor is a new type of driving source which does not need a magnet or wires. In a principle of operating the piezoelectric motor, a high frequency voltage is applied to the piezoelectric elements to vibrate the piezoelectric elements. The piezoelectric motor obtains a driving force in one direction due to the vibrations of the piezoelectric elements in order to obtain a rotary motion of the rotor.

Such a piezoelectric motor uses piezoelectric ceramics as piezoelectric elements.

However, the piezoelectric ceramics are high-priced. Thus, when the piezoelectric ceramics are processed to be applied to the piezoelectric motor, the small number of pieces of a raw material of the piezoelectric ceramics are to be thrown away. Since the piezoelectric ceramics relatively has a brittle property, the piezoelectric ceramics are to be carefully treated when being processed.

SUMMARY

The invention provides a piezoelectric motor including a stator on which a plurality of piezoelectric elements are arranged.

According to an embodiment of the invention, there is provided a piezoelectric motor including: a stator which includes first and second faces, wherein a plurality of piezoelectric elements are arranged on the first face, and a plurality of protrusions are formed on the second face; a rotor which is rotated by motions of waves of the stator generated by the piezoelectric elements; and a driver device which applies driving voltages to the piezoelectric elements, wherein polarization directions of the plurality of piezoelectric elements are vertical to a rotary face of the rotor.

The piezoelectric elements may be formed of piezoelectric ceramics.

The first and second faces may be parallel with each other.

The plurality of piezoelectric elements may be arranged in a circular ring shape on the first face.

The plurality of piezoelectric elements may be arranged at predetermined distances from one another on the first face.

The plurality of piezoelectric elements may be arranged on a plane.

Each of the plurality of piezoelectric elements may be formed of one piezoelectric ceramic layer.

Each of the plurality of piezoelectric elements may have a stack structure of a plurality of piezoelectric ceramic layers.

The piezoelectric elements may have polygonal shapes.

The polygonal shapes may be rectangular shapes.

The stator may have a circular ring shape.

The piezoelectric motor may further include: a first electrode which is disposed on an inner face of the stator and is electrically connected to the driver device; a second electrode which is disposed on an outer face of the stator and is electrically connected to the driver device; and a third electrode which is disposed on the outer face of the stator, is electrically connected to the driver device, and is electrically insulated from the second electrode.

A conductive material may be coated on the inner face of the stator to form the first electrode, and a conductive material may be coated on the outer face of the stator to form the second and third electrodes.

The first, second, and third electrodes may be formed using covered wires.

The first electrode may operate as a ground electrode.

The protrusions may contact the rotor.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described in detail by explaining exemplary embodiments of the invention with reference to the attached drawings.

Figure 1:
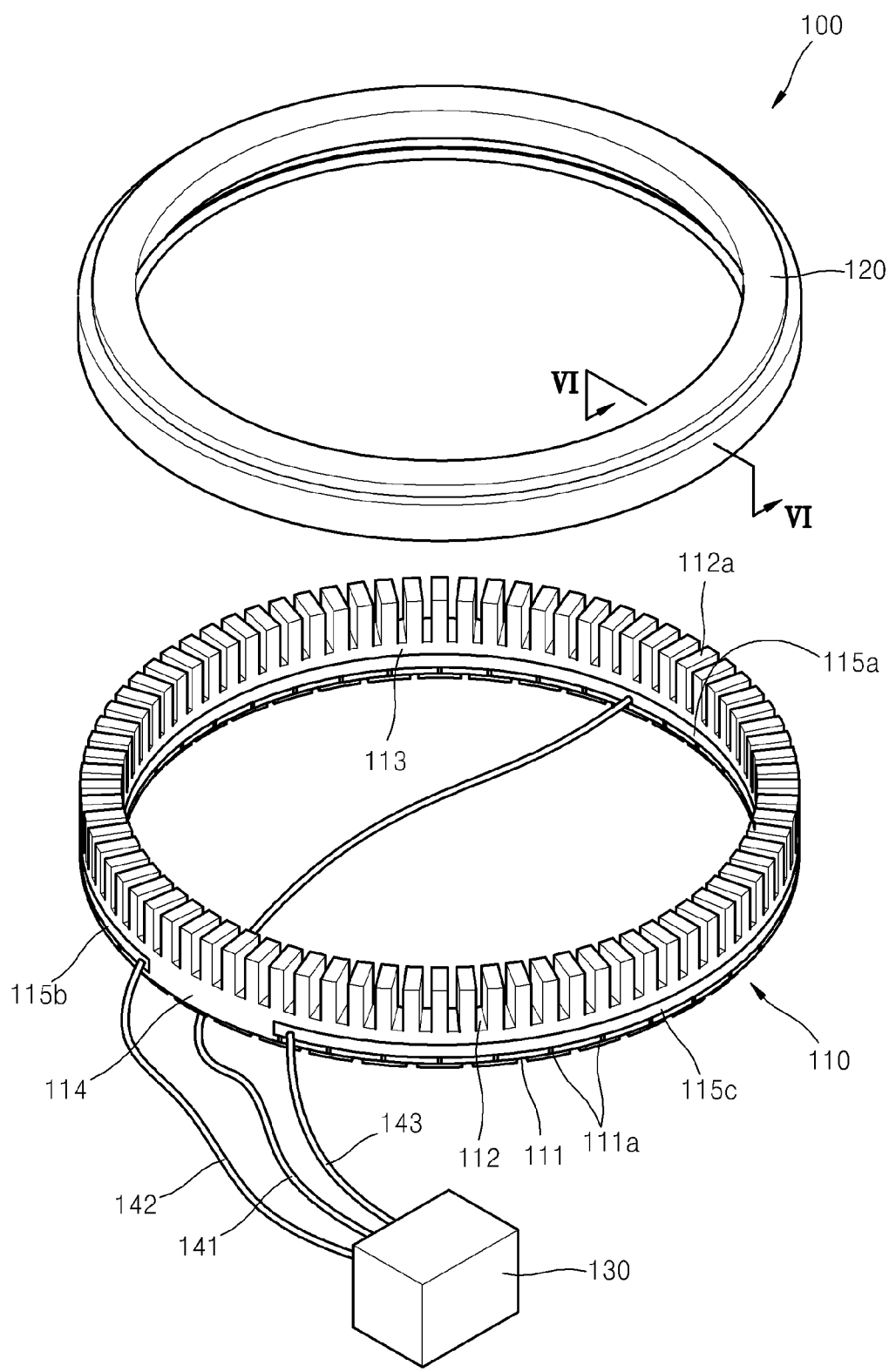
FIG. 1 is an exploded perspective view of a piezoelectric motor according to an embodiment of the invention.
Figure 2:
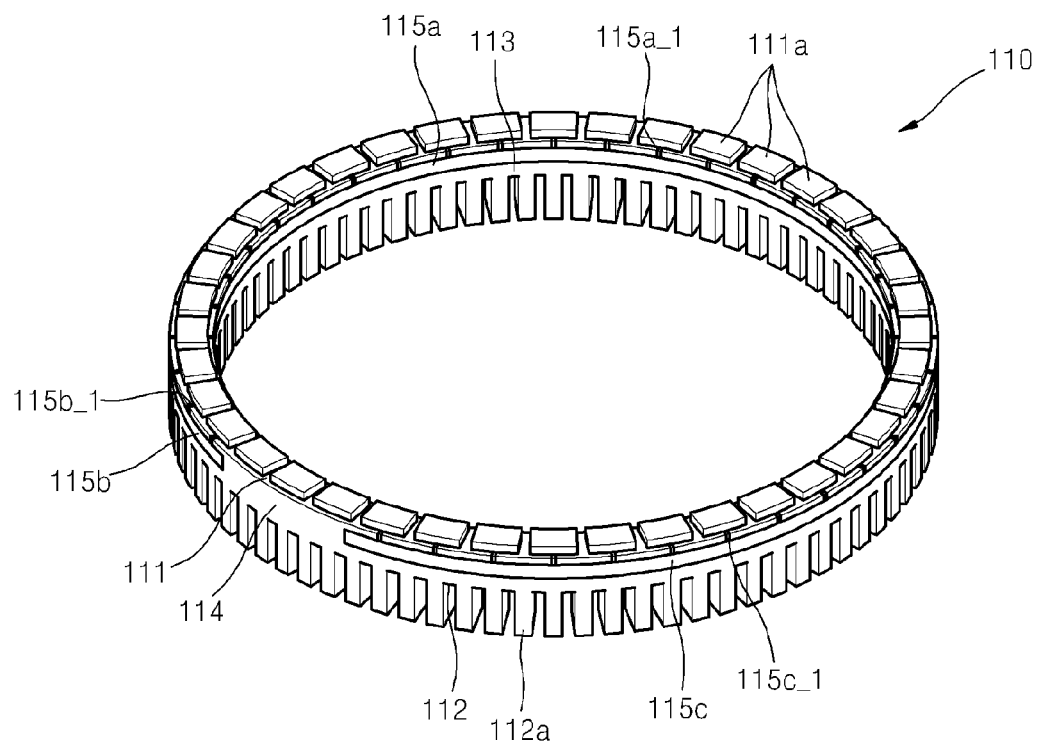
FIG. 2 is a perspective view of a plurality of piezoelectric elements arranged on a stator of FIG. 1.

FIG. 1 is an exploded perspective view of a piezoelectric motor according to an embodiment of the invention. FIG. 2 is a perspective view of a plurality of piezoelectric elements arranged on a stator according to an embodiment of the invention.

Referring to FIG. 1, a piezoelectric motor 100 according to the present embodiment includes a stator 110, a rotor 120, and a driver device 130.

As shown in FIGS. 1 and 2, the stator 110 has a circular ring shape.

The stator 110 includes a first face 111, a second face 112, an inner face (inner side) 113 which connects the first and second faces 111 and 112 to each other, and an outer face (outer side) 114 which connects the first and second faces 111 and 112 to each other.

A plurality of piezoelectric elements 111a are arranged on a plane. In other words, the plurality of piezoelectric elements 111a are arranged on the first face 111.

The piezoelectric elements 111a are adhered onto the first face 111 using an adhesive. The adhesive may be an epoxy-based adhesive, a solvent evaporation type adhesive, or the like.

The piezoelectric elements 111a are formed of a piezoelectric ceramic material and have rectangular shapes. The piezoelectric elements 111a are each formed of a single layer piezoelectric ceramic material as shown in FIGS. 1 and 2.

The piezoelectric elements 111a according to the present embodiment have the rectangular shapes but are not limited thereto. In other words, shapes of piezoelectric elements according to the invention are not particularly limited. For example, the piezoelectric elements according to the invention may have polygonal shapes, circular shapes, elliptical shapes, or the like.

Figure 3:
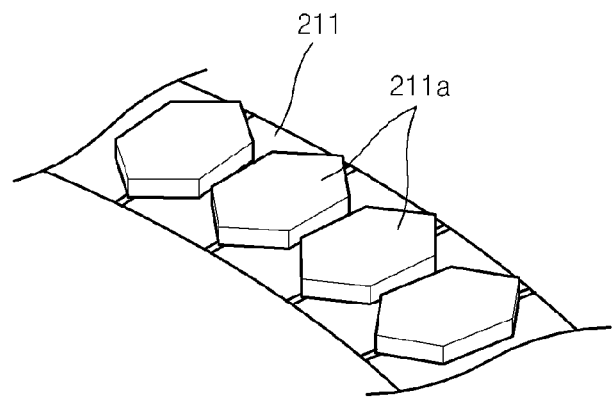
FIG. 3 is a partial perspective view of a plurality of piezoelectric elements arranged on a stator, according to another embodiment of the invention.

FIG. 3 is a partial perspective view of a plurality of piezoelectric elements arranged on a stator, according to another embodiment of the invention. Referring to FIG. 3, piezoelectric elements 211a are arranged on a first face 211 in hexagonal shapes.

The shapes of the piezoelectric elements 111a are the same as those made when a raw material of the piezoelectric elements 111 is cut to obtain the piezoelectric elements 111a. The shapes of the piezoelectric elements 110 may be determined so that a minimum number of useless leftover pieces of the raw material are made when the raw material of the piezoelectric elements 111a is cut.

The plurality of piezoelectric elements 111a are arranged and have the rectangular shapes in the present embodiment. The sizes and shapes of the piezoelectric elements 111a help bubbles generated in the adhesive to easily get out when the piezoelectric elements 111a are adhered onto the first face 111 using the adhesive. Thus, manufacturing cost and time are reduced.

Since the plurality of piezoelectric elements 111a are arranged in the present embodiment, the piezoelectric elements 111a are realized in much smaller sizes than a single piezoelectric element. Then, the plate-shaped raw material of the piezoelectric elements 111a is efficiently cut. Thus, the useless leftover pieces of the raw material of the piezoelectric elements 111a are minimally made when the raw material of the piezoelectric elements 111a is cut. As a result, manufacturing cost is reduced.

Figure 4:
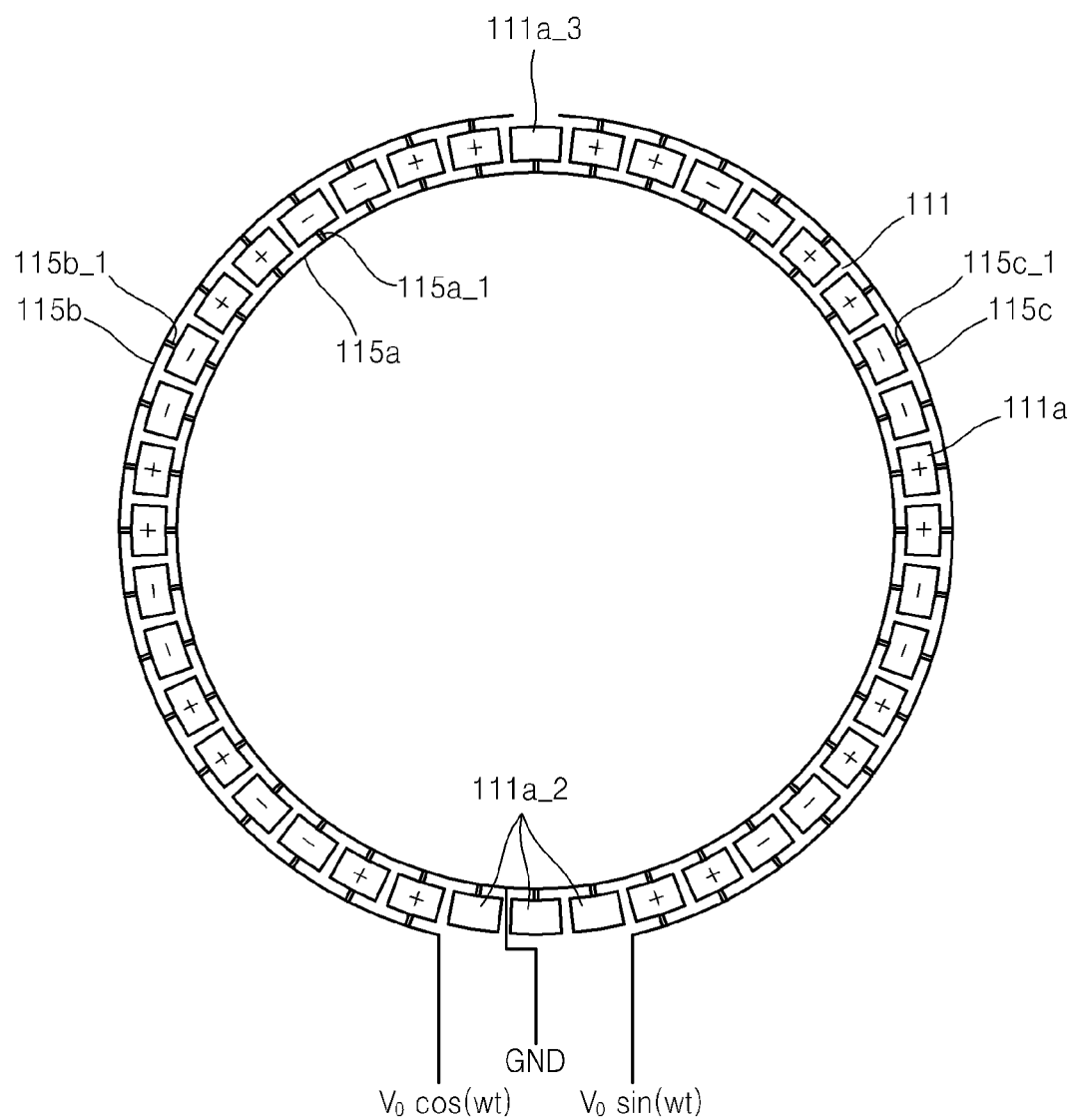
FIG. 4 is a plan view of arrangements of a plurality of piezoelectric elements according to an embodiment of the invention.

The piezoelectric elements 111a are electrically polarized, and polarities of the piezoelectric elements 111a are marked with "+" and "−" as shown in FIG. 4.

FIG. 4 is a plan view of arrangements of a plurality of piezoelectric elements according to an embodiment of the invention.

As shown in FIG. 4, the piezoelectric elements 111a are arranged at predetermined distances from one another in a circular ring shape.

Every two adjacent piezoelectric elements 111a make a pair to be polarized in the same direction. In other words, every two of the piezoelectric elements 111a make a pair to be arranged along a circular direction, and a polarity is alternately changed in every one pair. However, three piezoelectric elements 111a_2 in a lower position and one piezoelectric element 111a_3 in an upper position are not polarized.

Every two of the piezoelectric elements 111a according to the present embodiment are paired to be arranged along the circular direction, and the polarities of the piezoelectric elements 111a are alternately changed in every one pair. However, the invention is not limited. In other words, arrangement patterns of piezoelectric elements according to the invention may be appropriately reorganized according to design of a designer. For example, the piezoelectric elements may be arranged so that their polarities are alternately changed one by one.

The piezoelectric elements 111a are polarized before being arranged on the first face 111. In other words, the raw material of the piezoelectric elements 111a is cut in the rectangular shapes to prepare the piezoelectric elements 111a. Next, the piezoelectric elements 111a are polarized and then adhered onto the first face 111.

According to the present embodiment, the piezoelectric elements 111a are polarized before being arranged on the first face 111 but are not limited thereto. The piezoelectric elements 111a may be polarized after being arranged on the first face 111.

A main extending and shrinking direction of the plurality of piezoelectric elements 111a is the same as a polarization direction of the plurality of piezoelectric elements 111a. In various embodiments of the invention, the polarization direction of the piezoelectric elements 111a is vertical to a rotary face of the rotor 120.

In other words, the polarization direction of the piezoelectric elements 111a is arranged vertical to the first face 111 so that the extending and shrinking direction of the piezoelectric elements 111a is vertical to the first face 111. In this case, the rotary face formed by a rotation of the rotor 120 is parallel with the first face 111 in the present embodiment. Thus, the polarization direction and the main extending and shrinking direction of the piezoelectric elements 111a are vertical to the rotary face of the rotor 120.

The piezoelectric elements 111a of the invention are formed of one layer piezoelectric ceramic layer, i.e., a single layer piezoelectric ceramic layer, but are not limited thereto. Each of piezoelectric elements according to various embodiments of the invention may have a stack structure of a plurality of piezoelectric ceramic layers.

Figure 5:
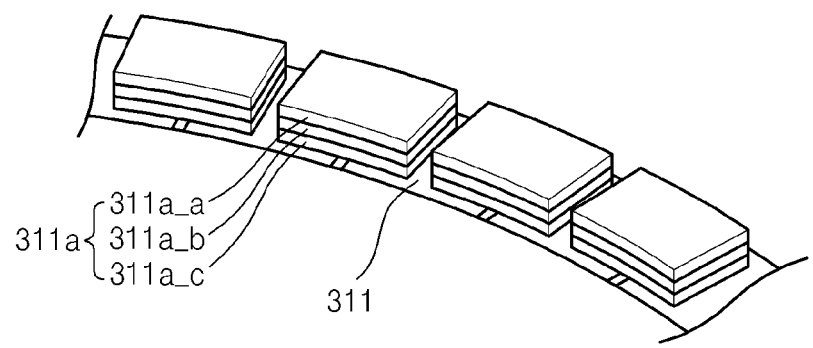
FIG. 5 is a partial perspective view of a plurality of piezoelectric elements arranged on a stator, according to another embodiment of the invention.

FIG. 5 is a partial perspective view illustrating a plurality of piezoelectric elements arranged on a stator, according to another embodiment of the invention. As shown in FIG. 5, a plurality of piezoelectric elements 311a are arranged on a first face 311, and each of the piezoelectric elements 311a has a stack structure of three piezoelectric ceramic layers 311a_a, 311a_b, and 311a_c. Even in this case, a polarization direction of each of the piezoelectric ceramic layers 311a_a, 311a_b, and 311a_c is vertical to the rotary face of the rotor 120. Whole extending and shrinking degrees of the piezoelectric ceramic layers 311a_a, 311a_b, and 311a_c are increased due to their multilayer structures, thereby increasing a rotation driving force of the rotor 120. In other words, the piezoelectric elements 311a having the multilayer piezoelectric ceramic layers 311a_a, 311a_b, and 311a_c exhibit higher performance than piezoelectric elements having single layer piezoelectric ceramic layers.

The piezoelectric elements 111a receive a driving voltage from the driver device 130. For this purpose, first, second, and third electrodes 115a, 115b, and 115c are arranged on the stator 110. Arrangement positions of the first, second, and third electrodes 115a, 115b, and 115c will be described later.

The second face 112 of the stator 110 is parallel with the first face 111.

A plurality of protrusions 112a are arranged on the second face 112 and protrude toward the rotor 120 to form a contact friction face between the stator 110 and the rotor 120.

The protrusions 112a amplify curved waves generated by the piezoelectric elements 111a and track an elliptical motion trajectory. In other words, the protrusions 112a, which participate in progressive curved waves, track the elliptical motion trajectory. Also, the each protrusion 112a having position differences and each portion of the protrusions 112a have phase differences and track the elliptical motion trajectory, thereby generating consecutive curved waves.

A first electrode 115a is disposed on the inner face 113 of the stator 110.

The first electrode 115a is electrically connected to the piezoelectric elements 111a, operates as a ground electrode when the piezoelectric motor 100 is driven, and is electrically connected to the driver device 130 through a connection cable 141.

Second and third electrodes 115b and 115c are arranged on the outer face 114 of the stator 110.

The second and third electrodes 115b and 115c operate as driving electrodes when the piezoelectric motor 100 is driven.

The second and third electrodes 115b and 115c are electrically insulated from each other. The designer classifies the piezoelectric elements 111a into two groups and electrically connects respectively the second and third electrodes 115b and 115c to each of the two groups.

Voltages having phase differences are applied to the second and third electrodes 115b and 115c when the piezoelectric motor 100 is driven, and the second and third electrodes 115b and 115c are electrically connected to the driver device 130 through connection cables 142 and 143, respectively.

In the present embodiment, the first electrode 115a operating as the ground electrode is disposed on the inner face 113 of the stator 110, and the second and third electrodes 115b and 115c operating as the driving electrodes are disposed on the outer face 114 of the stator 110. However, the invention is not limited thereto. In other words, according to the invention, the first, second, and third electrodes 115a, 115b, and 115c have only to be arranged on the stator 110, and their installation positions are not particularly limited. However, the first, second, and third electrodes 115a, 115b, and 115c may be arranged on the inner face 113 and the outer face 114 to avoid a friction with the rotor 120.

The first, second, and third electrodes 115a, 115b, and 115c of the present embodiment may be manufactured as follows.

A manufacturer coats a conductive material on the inner face 113 of the stator 110 to form the first electrode 115a. Here, a connection electrode 115a_1 is formed along with the first electrode 115a in order to electrically connect the first electrode 115a to the piezoelectric elements 111a.

The manufacturer coats a conductive material on the outer face 114 of the stator 110 to form the second and third electrodes 115b and 115c. Here, connection electrodes 115b_1 and 115c_1 are formed along with the second and third electrodes 115b and 115c in order to respectively electrically connect the second and third electrodes 115b and 115c to the piezoelectric elements 111a.

In the present embodiment, the conductive materials are coated on the stator 110 to form the first, second, and third electrodes 115a, 115b, and 115c. However, the invention is not limited thereto. In other words, according to an embodiment of the invention, covered wires may be disposed on the inner and outer faces 113 and 114 to form the first, second, and third electrodes 115a, 115b, and 115c. In this case, cover of the wires are peeled to electrically connect the first, second, and third electrodes 115a, 115b, and 115c to the connection electrodes 115a_1, 115b_1, and 115c_1 in order to form connection parts between the connection electrodes 115a_1, 115b_1, and 115c_1 and the first, second, and third electrodes 115a, 115b, and 115c.

The rotor 120 has a circular ring shape as shown in FIG. 1.

Figure 6:
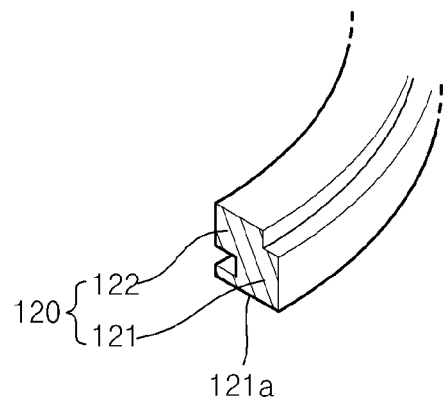
FIG. 6 is a perspective cross-sectional view taken along a line VI-VI of FIG. 1.

FIG. 6 is a cross-sectional view taken along a line VI-VI of FIG. 1. Referring to FIG. 6, the rotor 120 includes a rotor body 121 and a flange portion 122 which extends from the rotor body 121 toward an inner direction.

A lower surface 121a of the rotor body 121 contacts the protrusions 112a. In other words, the rotor body 121 receives the consecutive curved waves from the protrusions 112a of the stator 110 and changes the consecutive curved waves into the rotary motion of the rotor 120.

The flange portion 122 is relatively thinner than the rotor body 121 and thus has lower rigidity than the rotor body 121. The structure of the flange portion 122 enables the rotor 120 to be flexibly deformed in order to increase a contact area between the rotor 120 and the protrusions 112a. The flange portion 122 also stably maintains the contact between the rotor 120 and the protrusions 112a when the piezoelectric motor 100 is driven, in order to prevent loss of transmitted electric power and reduce abrasions caused by frictions among parts.

The driver device 130 applies a voltage to the plurality of piezoelectric elements 111a arranged on the first face 111 of the stator 110.

The driver device 130 applies a cosine wave voltage and a sine wave voltage to the second and third electrodes 115b and 115c, respectively. Here, when the cosine wave voltage has a phase difference of 90° with the sine wave voltage, a driving reference voltage is $V_o$, a constant is w, and time is t, the cosine wave voltage is $V_o \times \cos(wt)$, and the sine wave voltage is $V_o \times \sin(wt)$.

In other words, the driver device 130 applies driving voltages having phase differences through the second and third electrodes 115b and 115c and leads the first electrode 115a to operate as the ground electrode. Thus, the plurality of piezoelectric elements 111a extend and shrink, thereby generating the curved waves of the stator 110.

The driver device 130 according to the present embodiment applies the cosine and sine wave voltages to the second and third electrodes 115b and 115c, respectively. However, the invention is not limited thereto. In other words, types of voltages applied by a driver device according to the invention may vary with the number of electrodes and arrangement patterns of piezoelectric elements.

An operation of the piezoelectric motor 100 of the present embodiment will now be described with reference to FIGS. 7 through 9.

Figure 7:
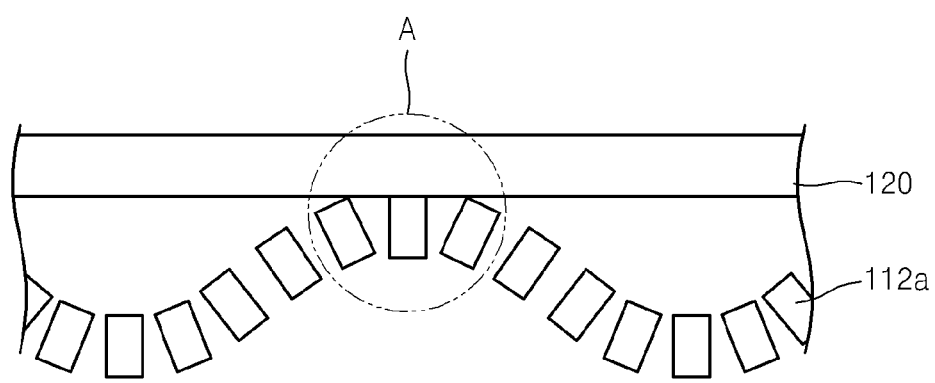
FIG. 7 is a pictorial schematic view illustrating protrusions of a stator and a rotor, i.e., a contact operation between the protrusions of the stator and the rotor, according to an embodiment of the invention.

FIG. 7 is a schematic view illustrating protrusions of a stator and a rotor, i.e., a contact operation between the protrusions of the stator and the rotor, according to an embodiment of the invention. FIG. 8 is a magnified view of part A of FIG. 7. FIG. 9 is a schematic perspective view illustrating protrusions of a stator and a rotor, i.e., a mutual motion between the protrusions and the rotor, according to an embodiment of the invention.

When a user applies a power source to the piezoelectric motor 100 and turns a switch on, the driver device 130 applies driving voltages to the plurality of piezoelectric elements 111a.

Here, the driver device 130 applies the driving voltage, i.e., the cosine and sine wave voltages having predetermined frequencies, to the piezoelectric elements 111a through the second and third electrodes 115b and 115c.

The first electrode 115a is connected to the driver device 130, and ground operations of the piezoelectric elements 111a perform through the first electrode 115a.

When the driver device 130 applies the driving voltages to the piezoelectric elements 111a, the piezoelectric elements 111a extend and shrink in a direction vertical to the first face 111 according to frequencies of the driving voltages. Extending and shrinking of the piezoelectric elements 111a generate the consecutive curved waves of the stator 110. In this case, a rotary force starts to be transmitted to the rotor 120 due to a contact between the protrusions 112a forming peak parts of the curved waves induced to the stator 110 and the rotor 120.

Figure 8:
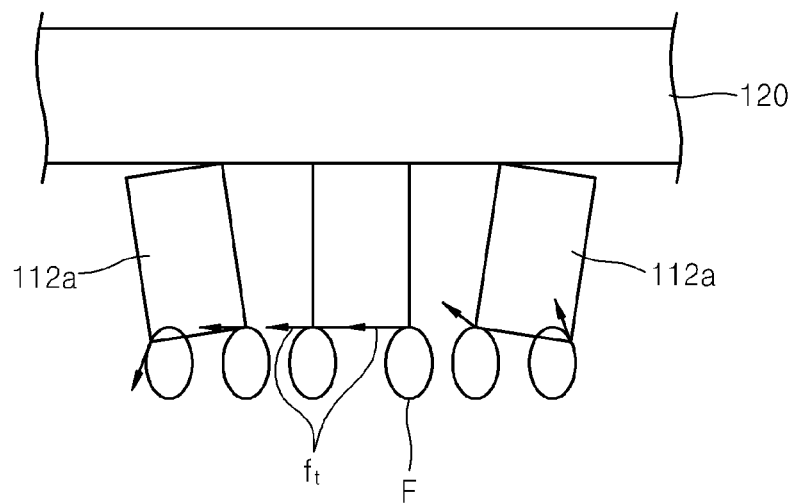
FIG. 8 is a magnified view of part A of FIG. 7.

In other words, as shown in FIG. 8, a motion trajectory F of the protrusions 112a is elliptical, and the protrusions 112a transmit the rotary force to the rotor 120 due to a tangential motion $f_t$ on the motion trajectory F.

Figure 9:
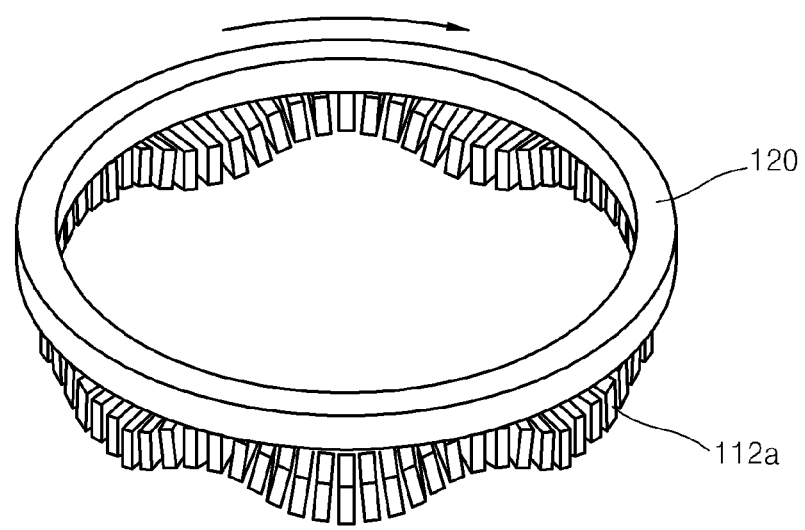
FIG. 9 is a schematic perspective view illustrating protrusions of a stator and a rotor, i.e., a mutual motion between the protrusions and the rotor, according to an embodiment of the invention.

As shown in FIG. 9, motions of the curved waves of the stator 110 wholly work on the rotor 120. Thus, the rotor 120 performs the rotary motion, thereby driving the piezoelectric motor 100.

As described above, the plurality of piezoelectric elements 111a having the polygonal shapes are arranged on the stator 110 in the piezoelectric motor 100 of the present embodiment. Thus, the raw material of the piezoelectric elements 111a is efficiently cut when the piezoelectric elements 111a are prepared. Therefore, cost for preparing the piezoelectric elements 111a is reduced.

Also, the piezoelectric elements 111a according to the present embodiment have the polygonal shapes which enable an easy prediction of extending and shrinking patterns of the raw material of the piezoelectric elements 110 when the piezoelectric elements 111a are manufactured. Thus, time for manufacturing the piezoelectric elements 111a is relatively reduced.

In the piezoelectric motor 110 of the present embodiment, the plurality of piezoelectric elements 111a, which have been polarized, are arranged on the stator 110. Thus, the piezoelectric elements 111a are easily arranged on the stator 110.

As described above, a piezoelectric motor having a simple, efficient structure is realized. Therefore, manufacturing cost is reduced.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A piezoelectric motor comprising:
a stator which comprises first and second faces, wherein a plurality of piezoelectric elements are arranged on the first face, and a plurality of protrusions are formed on the second face;
a rotor which is rotated by motions of waves of the stator generated by the piezoelectric elements; and
a driver device which applies driving voltages to the piezoelectric elements,
wherein polarization directions of the plurality of piezoelectric elements are vertical to a rotary face of the rotor,
wherein each of the plurality of piezoelectric elements has a stack structure of a plurality of piezoelectric ceramic layers.

2. The piezoelectric motor of claim 1, wherein the piezoelectric elements are formed of piezoelectric ceramics.

3. The piezoelectric motor of claim 1, wherein the first and second faces are parallel with each other.

4. The piezoelectric motor of claim 1, wherein the plurality of piezoelectric elements are arranged in a circular ring shape on the first face.

5. The piezoelectric motor of claim 1, wherein the plurality of piezoelectric elements are arranged at predetermined distances from one another on the first face.

6. The piezoelectric motor of claim 1, wherein the plurality of piezoelectric elements are arranged on a plane.

7. The piezoelectric motor of claim 1, wherein the piezoelectric elements have polygonal shapes.

8. The piezoelectric motor of claim 7, wherein the polygonal shapes are rectangular shapes.

9. The piezoelectric motor of claim 1, wherein the stator has a circular ring shape.

10. The piezoelectric motor of claim 9, further comprising:
a first electrode which is disposed on an inner face of the stator and is electrically connected to the driver device;
a second electrode which is disposed on an outer face of the stator and is electrically connected to the driver device; and
a third electrode which is disposed on the outer face of the stator, is electrically connected to the drive device, and is electrically insulated from the second electrode.

11. The piezoelectric motor of claim 10, wherein a conductive material is coated on the inner face of the stator to form the first electrode, and a conductive material is coated on the outer face of the stator to form the second and third electrodes.

12. The piezoelectric motor of claim 10, wherein the first, second, and third electrodes are formed using covered wires.

13. The piezoelectric motor of claim 10, wherein the first electrode operates as a ground electrode.

14. The piezoelectric motor of claim 1, wherein the protrusions contact the rotor.

\* \* \* \* \*